United States Patent [19]

Louis

[11] 4,094,271

[45] June 13, 1978

[54] AQUARIUM BACKSTRIP

[76] Inventor: Anthony Louis, 437 Grinnell Dr., Burbank, Calif. 91501

[21] Appl. No.: 737,542

[22] Filed: Nov. 1, 1976

[51] Int. Cl.² ............................................ A01K 63/00
[52] U.S. Cl. ........................................ 119/5; 220/266; 49/482; 119/3; 206/469; 206/820; 220/287; 220/306
[58] Field of Search .............................. 119/5, 3, 19, 1; 210/169; 220/265, 266, 287, 306, 307, 23.8; 206/467, 469, 820; 49/482; 312/209; D30/6–12

[56] References Cited

U.S. PATENT DOCUMENTS

| | | | |
|---|---|---|---|
| 1,767,150 | 6/1930 | McCassey et al. | 119/5 |
| 2,636,308 | 4/1953 | Demmer | 119/5 |
| 2,776,642 | 1/1957 | Sepersky | 119/5 |
| 3,018,758 | 1/1962 | Arnould | 119/5 |
| 3,021,001 | 2/1962 | Donofrio | 220/23.8 |
| 3,066,645 | 12/1962 | Mulder | 119/5 |
| 3,393,794 | 7/1968 | Borin | 312/209 |
| 3,477,679 | 11/1969 | Lovitz | 210/169 |
| 3,515,097 | 6/1970 | Sherman | 210/169 |
| 3,721,212 | 3/1973 | Groth | 119/5 |
| 3,841,267 | 10/1974 | Miller | 119/5 |
| 3,857,366 | 12/1974 | Willinger | 119/5 |

*Primary Examiner*—Clyde I. Coughenour
*Attorney, Agent, or Firm*—Fulwider, Patton, Rieber, Lee & Utecht

[57] ABSTRACT

A backstrip that overlies a portion of an aquarium includes a plurality of openings of different sizes and shapes through which accessories can be inserted downwardly into the aquarium. A cover is provided for each opening, and has a flange on its underside for engaging the walls of the opening, and some covers have break lines along which they can be separated into sections used to partially cover the associated openings.

5 Claims, 8 Drawing Figures

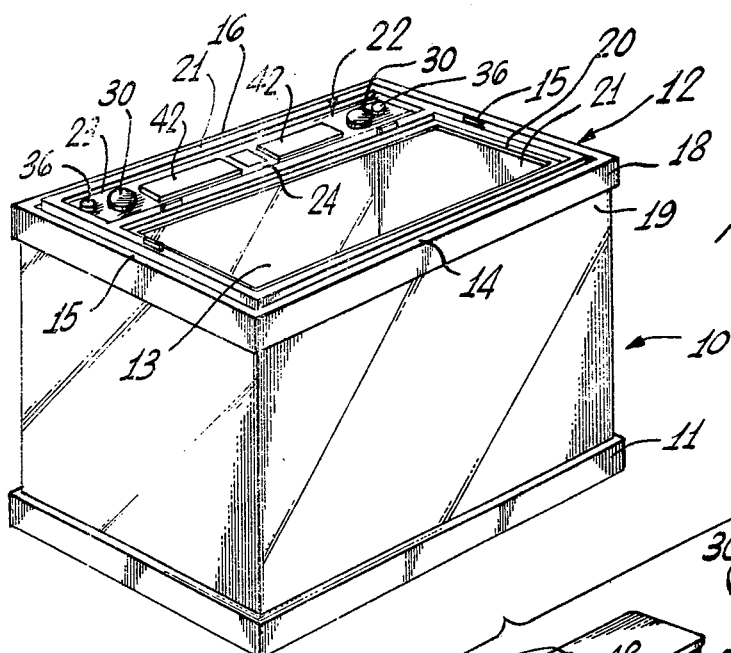
*fig.1*
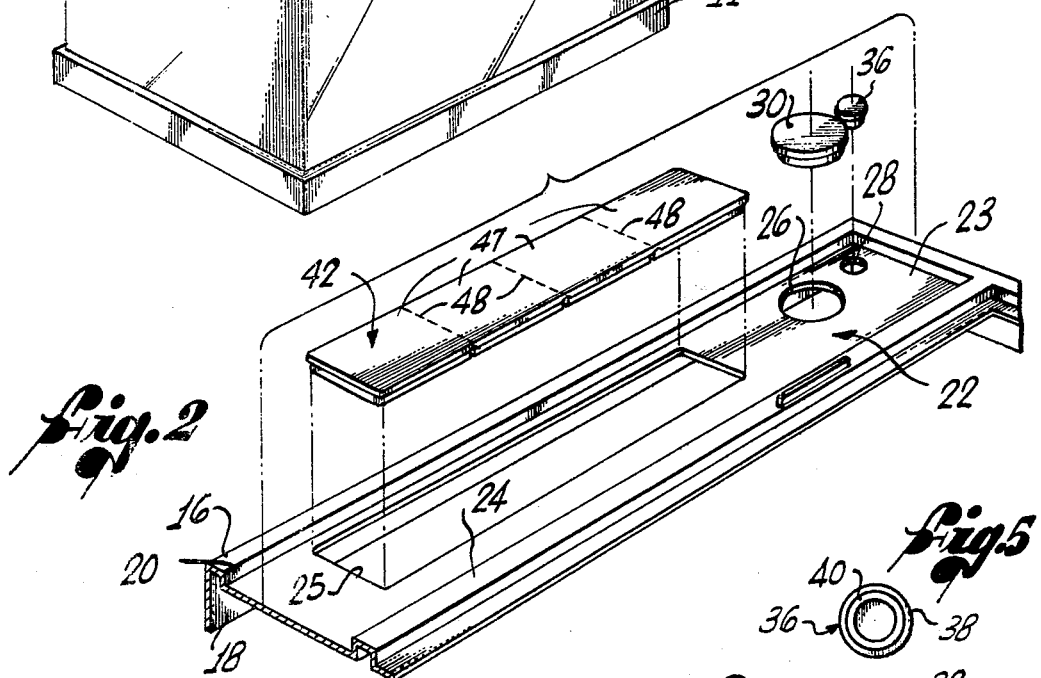
*fig.2* *fig.5*
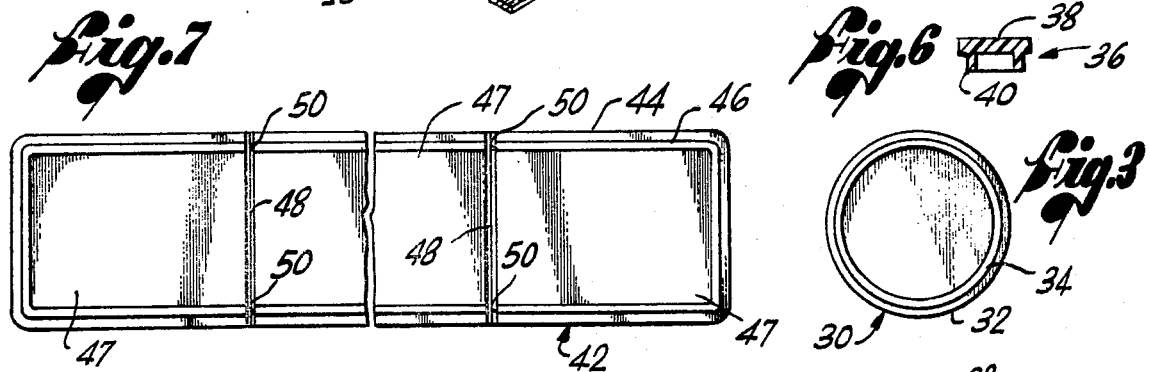
*fig.7* *fig.6* *fig.3*
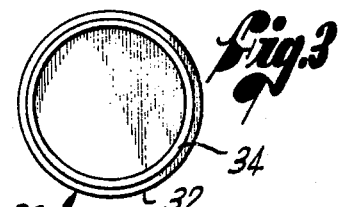
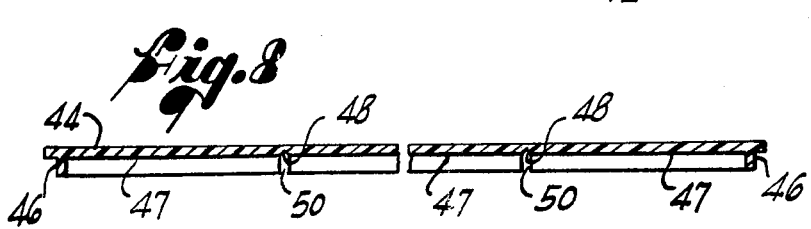
*fig.8* *fig.4*

AQUARIUM BACKSTRIP

BACKGROUND OF THE INVENTION

The present invention relates to aquariums, and more particularly to aquarium backstrips used to support accessory equipment.

In a typical modern aquarium, a variety of accessory equipment is used to measure and control the aquatic environment within the narrow limits required by many species of fish that hobbyists favor. These accessories are arranged along a horizontal shelf-like member known as a backstrip so that they project downwardly into the water of the tank below. Common examples of accessory equipment are thermometers, heaters, aerators, filters, feeders and pumps.

Backstrips are typically constructed of plastic, metal, or wood and have a variety of preformed openings to accommodate the usual accessories. The preformed openings permit the hobbyist to quickly and easily arrange his accessories, but he cannot depart from the arrangement dictated by the openings. This inflexibility of the arrangement is undesirable because hobbyists frequently wish to add or replace accessories, to rearrange them for different purposes, or to experiment with their effectiveness at different locations.

An alternative to backstrips with performed openings has been a backstrip that has no openings or only a few openings, but which can be modified by cutting additional openings where desired. This approach, however, has significant drawbacks. Many hobbyists lack the tools and skills, if not the inclination, to do the necessary cutting, and the backstrip itself must be of increased strength and durability, and therefore of greater cost, if it is to withstand the cutting forces. Moreover, these backstrips must be removed from the tank before new openings can be formed; otherwise sufficient cutting force could not be applied without risking damage to the equipment, and the debris from the cutting operation would fall into the tank. Even when the backstrip is removed it is difficult to do a satisfactory job of changing the location of accessory openings.

An important disadvantage of both preformed backstrips and those with openings cut by the hobbyist is that once the openings have been formed, they cannot be readily reclosed. The backstrip, therefore, does not permit the rearrangement of accessories as desired, and uncovered and unused openings remit increased evaporation from the aquarium.

The principal purpose of the present invention is to provide a backstrip that combines the convenience of preformed backstrips with the flexibility of customized backstrips and at the same time provides a new degree of adaptability to permit frequent changes in the arrangement of aquarium equipment.

SUMMARY OF THE INVENTION

The present invention resides in a novel backstrip which has preformed openings and covers for those openings that can be removed and reinserted. While this backstrip is structurally uncomplicated and inexpensively manufactured, it permits openings for accessory equipment to be quickly and easily provided without removal of the backstrip from the tank and permits the openings to be conveniently reclosed, and partially closed, as desired.

The backstrip includes a body adapted to be supported in a position overlying a portion of an aquarium. A plurality of openings of different sizes and shapes extend through the body to receive aquarium equipment, and covers are provided which are sized and shaped to close the openings when installed on the body. The covers have plate-like top members at least as large as the openings to be closed thereby and means on the underside for fitting into the openings and holding the covers releasably in place. One or more of the covers includes means weakening it along at least one preselected break line, whereby that cover may be separated into two or more sections to close only part of the associated opening. The backstrip can be integrally formed as part of a molded plastic aquarium top.

Other features and advantages of the present invention will become apparent from the following detailed description, taken in conjuction with the accompanying drawings, which illustrate, by way of example, the principles of the invention.

DESCRIPTION OF THE DRAWINGS

FIG. 1 is a three-dimentional perspective view of an aquarium, equipped with a backstrip in accordance with the invention;

FIG. 2 is an enlarged, fragmentary, exploded, perspective view of the backstrip showing removable covers above corresponding openings;

FIG. 3 is an enlarged, bottom, plan view of the larger round cover shown in FIG. 2;

FIG. 4 is a cross-sectional side view of the cover of FIG. 3;

FIG. 5 is an enlarged, bottom, plan view of the smaller round cover shown in FIG. 2;

FIG. 6 is a cross-sectional side view of the cover of FIG. 5;

FIG. 7 is an enlarged, fragmentary, bottom, plan view of the elongated rectangular cover shown in FIG. 2; and FIG. 8 is a fragmentary, cross-sectional, side view of the cover of FIG. 7.

DESCRIPTION OF THE PREFERRED EMBODIMENT

The present invention is embodied in a backstrip for an aquarium that includes preformed openings and covers for those openings that can be readily removed and reinserted to permit rearrangement of aquarium equipment as desired. To illustrate the invention, FIG. 1 shows an aquarium that includes a rectangular, glass-walled tank 10 with a base 11. A rectangular top 12 of lightweight molded plastic rests on the top of the tank as defines a large rectangular opening 13 that permits access to the interior of the tank.

The top 12 includes a front peice 14, two side pieces 15 and a back piece 16, all of which are narrow, elongated plastic strips resting on the top edges of the tank walls. An outer lip 18 extends downwardly from the front, side and back pieces about the entire perimeter of the top and engages the outer surface 19 of the tank walls to hold the top in place. To further secure the top, a similar inner lip 20 extends downwardly about the inner surface 21 of the tank walls.

A backstrip 22 of the top 12 is formed as a rectangular recessed area 23 bounded along two sides and the rear by the inner lip and bounded along the front by an upstanding reinforcing rib 24 that extends across the tank 10 between the side pieces. In the illustrative structure described here, the entire top is integrally formed of molded plastic, but the backstrip could be formed separately.

The purpose of the backstrip 22 is to support accessory equipment (not shown) such as thermometers, heaters, aeraters, filters, feeders and pumps so that they project downwardly into the water of the tank 10. These accessories are received by a plurality of suitably sized and shaped openings arrayed along the recessed area 23.

The exemplary openings in the left-hand half of the backstrip 22, illustrated in FIG. 2, include an elongated rectangular opening 25, a large circular opening 26 closer to the end of the recess 23 and a smaller circular opening 28 near a back corner of the recess. Although this arrangement of openings is provided on each half of the backstrip 17, by way of example, other configurations can be substituted as desired.

Each opening 25, 26, and 28 has a cover that is sized and shaped to close the opening when installed on the body of the backstrip. A cover 30, which corresponds to the larger circular opening 26 and is illustrated in FIG. 3 and 4, includes a round plate-like top member 32 that is slightly larger in diameter than the opening 26 and a downwardly projecting cylindrical flange 34 on its underside that fits securely into the opening. The plastic of the cover 30 and the backstrip 22 have sufficient resilience that the flange 34 can be inserted into the opening when the cover is pressed downwardly, but it is easily released when the cover is pressed upwardly from the underside. A smaller round cover 36 corresponds to the smaller circular opening 28 in the backstrip 22 and includes a plate-like member 38 and a downwardly projecting flange 40, both of which are properly dimensioned to fit the opening 28 in the same way.

A cover 42 which corresponds to the elongated rectangular opening 25 is of different construction, best shown in FIGS. 7 and 8. It includes a rectangular plate-like top member 44 slightly larger than the opening 25, and a downwardly projecting flange 46 set inwardly from the perimeter of the plate-like member 44 to engage the edge of opening 25. The cover is divided into a row of separable cover sections 47 by a series of break lines 48 perpendicular to its longitudinal axis. Each break line is defined by a groove in the underside of the plate-like member 44 aligned with notches forming gaps 50 in the flange, so that the sections can be separated by flexing the cover until the plastic fails where thus weakened. The separated sections can then serve as partial covers for the opening 25.

The invention provides a backstrip with preformed openings that can be reclosed as desired so that the aqaurium equipment can be quickly and easily rearranged to suit the needs of the moment, without removing the backstrip from the tank. The openings 25 can be partially closed after separating any selected number of the sections of the associated covers along the preformed break lines, to reduce the amount of open area of the top. The backstrip thus provides a new degree of flexibility and adaptability for aquarium equipment.

While a particular form of the invention has been illustrated and described, it will be apparent that various modifications can be made without departing from the spirit and scope of the invention.

I claim:

1. An aquarium top backstrip having, in combination:
   a body adapted to be supported in a position overlying a portion of an aquarium;
   means defining a plurality of openings extending through said body for receiving aquarium equipment; and
   a plurality of plastic covers for said openings sized and shaped to close the openings when installed on said body, said covers having plate-like top members at least as large as the openings to be closed thereby, and means on the undersides of the covers for fitting into the openings and holding the covers tightly but releasably in place on said body;
   at least one of said covers including means extending across the cover and weakening the cover along at least one preselected break line, whereby the cover may be separated into at least two sections to produce a partial cover for the associated opening held in place in the opening by said means on the underside thereof, and a replaceable cover for the remainder of the opening, and said sections may be rearranged in the associated opening to expose and cover different portions of the opening.

2. The aquarium top backstrip of claim 1, wherein said means for holding said covers releasably in place comprise flanges extending downwardly from the undersides of said top members, said top members and flanges being integrally formed of plastic.

3. An aquarium top comprising: a front piece, two side pieces and a back piece adapted to be supported in a position overlying the walls of an aquarium tank;
   an outer lip and an inner lip integrally formed with said front, side and back pieces that engage the inner and outer top edges, respectively, of the walls of the aquarium tank;
   a reinforcing rib that extends between said side pieces and is integrally formed therewith;
   a rectangular, recessed, shelf-like backstrip bounded by said inner lip and said reinforcing rib and defining a plurality of openings extending therethrough to receive aquarium equipment; and
   a plurality of plastic covers for said openings sized and shaped to close the openings when installed on said backstrip, said covers having plate-like top members at least as large as the openings to be closed thereby, and means on the undersides of the covers for fitting into the openings and holding the covers tightly but releasably in place on said body;
   at least one of said covers including means extending across the cover and weakening the cover along at least one preselected break line, whereby the cover may be separated into at least two sections to produce a partial cover for the associated opening held in place in the opening by said means on the underside thereof, and a replaceable cover for the remainder of the opening, and said sections may be rearranged in the associated opening to expose and cover different portions of the opening.

4. The aquarium top of claim 3, wherein said front, side, and back pieces, said inner and outer lips, said reinforcing rib and said backstrip are all formed as a single piece of molded plastic.

5. The aquarium top backstrip of claim 4, wherein said means for holding said covers releasably in place comprise flanges extending downwardly from the underside of said top members, said top members and flanges being integrally formed of plastic.

* * * * *